United States Patent
Imai et al.

(10) Patent No.: US 9,430,019 B2
(45) Date of Patent: Aug. 30, 2016

(54) METHOD OF CHANGING OVER COMPUTER FROM POWER-ON STATE TO POWER-SAVING STATE

(71) Applicant: LENOVO (Singapore) PTE, LTD., New Tech Park (SG)

(72) Inventors: Takumi Imai, Kamakura (JP); Kazuhiro Kosugi, Sagamihara (JP); Yoshikage Ochi, Tokyo (JP)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 202 days.

(21) Appl. No.: 14/149,129

(22) Filed: Jan. 7, 2014

(65) Prior Publication Data

US 2014/0201551 A1 Jul. 17, 2014

(30) Foreign Application Priority Data

Jan. 16, 2013 (JP) .................................. 2013-005435

(51) Int. Cl.
*G06F 1/32* (2006.01)

(52) U.S. Cl.
CPC ........... *G06F 1/3206* (2013.01); *G06F 1/3212* (2013.01); *G06F 1/3218* (2013.01); *Y02B 60/1292* (2013.01)

(58) Field of Classification Search
CPC ............... G06F 1/32; G06F 1/26; G06F 1/28
USPC ....... 713/300, 310, 320, 321, 322, 323, 324, 713/330, 340, 370
See application file for complete search history.

(56) References Cited

U.S. PATENT DOCUMENTS

| | | | | |
|---|---|---|---|---|
| 7,484,108 | B2* | 1/2009 | Diefenbaugh | G06F 1/206 713/300 |
| 8,504,690 | B2* | 8/2013 | Shah | H04L 12/12 709/200 |
| 8,611,257 | B1* | 12/2013 | Nachum | H04L 12/4013 370/255 |
| 2010/0122101 | A1* | 5/2010 | Naffziger | G06F 1/206 713/340 |
| 2011/0314312 | A1* | 12/2011 | Naffziger | G06F 1/3203 713/323 |
| 2013/0217432 | A1* | 8/2013 | Li | H04W 52/0203 455/517 |

FOREIGN PATENT DOCUMENTS

| | | |
|---|---|---|
| JP | 10-187620 | 7/1998 |
| JP | 11-161385 | 6/1999 |
| JP | 2000-305670 | 11/2000 |
| JP | 2007-233894 | 9/2007 |
| JP | 2011-150610 | 8/2011 |

* cited by examiner

*Primary Examiner* — Jaweed A Abbaszadeh
*Assistant Examiner* — Keshab Pandey
(74) *Attorney, Agent, or Firm* — Kunzler Law Group

(57) ABSTRACT

A power state controlling method is provided that balances quick resumption with reduction of power consumption. An upper limit value Pih and a lower limit value Pil of a power idle state are set for the magnitude of power consumption of a system. The power consumption of the system in a power-on state is calculated. The system changes over to a suspended state when a predetermined time elapses after the system changes over to the power idle state with the lowering of the power consumption.

16 Claims, 8 Drawing Sheets

METHOD OF CHANGING OVER COMPUTER FROM POWER-ON STATE TO POWER-SAVING STATE

FIELD

The subject matter disclosed herein relates a technique of changing over a computer from a power-on state to a power-saving state, and more particularly, to a technique of causing a computer to reasonably balance the ability to quickly resume operation with reduction of power consumption.

BACKGROUND

To conserve power, a system may change over to a power state including a power-on state, a sleep state, and a software-off state. Since the system can perform useful processes only in the power-on state, the system in the sleep state or the software-off state needs to perform the processes after changing over to the power-on state. Various depths are defined in the sleep state, and the deeper the depth is, the smaller the power consumption is and the longer the time (latency time) until changing over to the power-on state is. In the power-off state, power supply to most devices is stopped and thus the power consumption is minimized but the latency time is maximized.

When a system is in a power-on state, a central processing unit (CPU) or other device (devices other than the CPU that are connected with the computer will be simply be referred to as devices hereinafter) dynamically change over to various power states depending on operation states, thereby achieving reduction of power consumption. The CPU changes over between an active state and a sleep state when the system is in a power-on state, and a supply of power is stopped and the system lies in a stopped state when the system is in a sleep state or a soft-off state. The devices can change over between the active state and the sleep state or the stopped state when the system is in the power-on state. Many devices are stopped when the system is in the sleep state.

The CPU can execute processes when the system is in the active state, but first changes over to the active state in response to an interruption and then executes the processes when the system is in the sleep state. The sleep state of the CPU has various depths from the viewpoint of power consumption and latency time. The deeper the depth of the sleep state becomes, the lower the power consumption is and the longer the latency time is. An OS and a chip set control the depth of the CPU in the sleep state depending on a utilization rate of the CPU.

The CPU controls items which are factors of the power consumption such as core voltage, clock operation, clock frequency, PLL operation, and flash of cache context depending on the depth of the sleep state. Here, the utilization rate Y of the CPU can be calculated by the following expression, where Ui represents the ratio of a user mode time in idle processes, Ki represents the ratio of a kernel mode time in idle processes, and Et represents the elapsed time.

$$Y=(1-(Ui+Ki)/Et)\times 100\%$$

A state in which the utilization rate of the CPU is close to zero is generally referred to as an idle state, but is referred to as a utilization-rate idle state in this specification. Previously, the power consumption of a system was thought to be very small when the system changes over to the utilization-rate idle state. However, when the system is in the power-on state, the devices change over to predetermined power states through independent algorithms. Accordingly, even when the system changes over to the utilization-rate idle state, the system consumes constant power. For example, in certain systems, the power consumption of the system in the utilization-rate idle state may be about 5 W and the power consumption in the sleep state may be about 110 mW.

A CPU typically has a memory controller function, a graphics function, and the like installed therein in addition to the core functions, and thus the power consumption thereof tends to further increase. In recent years, the Intel® company has proposed a new power management technique in which plural power states (S0ix) are defined in the power-on state in order to reduce power consumption of a system in the utilization-rate idle state. In this technique, a CPU that can change over to a deeper sleep state is provided. A technique of changing over the CPU to a sleep state as deep as possible in the utilization-rate idle state by performing a delayable interruption and a DMA access together is introduced, or the devices are actively requested to change over to a stopped state.

The Microsoft® company recommends run-time idle state detection or S0 idle mounting for lowering the power of the devices in the idle state during operation of the system. The company proposes a technique of completely stopping the supply of power to the devices during operation of the system. This technique is also generally called Run-time D3. In the run-time idle state detection, the devices change over from the power-on state to a sleep state deeper than a conventional sleep state or to a stopped state. Therefore, by introducing such a new power management technique in the power-on state, the power consumption of the system is reduced to the vicinity of the power consumption in the suspended state in the future when the utilization rate of the CPU is lowered or the idle time of the device is raised in the system in the power-on state.

SUMMARY

A computer (also referred to as a system) is changed over from the power-on state to the sleep state when the duration of a utilization-rate idle state (idle time) counted using an idle timer by the OS reaches a predetermined value. In the utilization-rate idle state quick resuming of returning the CPU and the devices to an active state with a short latency time can be realized, but battery power is consumed without performing a useful process.

The idle time occurring when the user temporarily stops access during operation of the laptop PC is relatively short, but the idle time when the user goes away from the laptop PC is long. When the idle time is short, it is important to secure the opportunity to quickly resume from the viewpoint of convenience, but it is important to reduce the consumption of the battery as the idle time becomes longer. Since the ability to quickly resume and the reduction of consumption of a battery are in a trade-off relationship, it is preferable that the time for securing the ability to quickly resume be determined depending on the magnitude of the power consumption of the system.

In the utilization-rate idle state, it is thought that the CPU changes over to a deep sleep state and the power consumption thereof reaches the lowest level, but the power consumption of the system greatly varies depending on the device states. When the new power management proposed by Intel® or Microsoft® is introduced, the power consumption in the power-on state will be further reduced. Therefore, in the conventional method of determining necessity for changing over a system to a sleep state on the basis of the utilization rate of the CPU and determining the time for the changeover, it is not possible to appropriately balance the power consumption of a battery and the ability to quickly resume.

For example, when the power consumption of the system is reduced to be close to the power consumption in the sleep state, it is reasonable that the power-on state be maintained to give priority to the ability to quickly resume. In more balanced power management, it is preferable that the smaller the power consumption of the system is, the longer the time for securing the opportunity of quick resuming by maintaining the power-on state is.

Therefore, the present disclosure in certain embodiments provides a method of changing over a computer from a power-on state to a power-saving state. In another embodiment, the present disclosure provides a method of balancing the ability to quickly resume and reduction of power consumption. Also disclosed are a computer and a computer program for realizing the method.

According to a first aspect, there is provided a method of changing over a system of a computer operating in a power-on state to a power-saving state. The power-saving state may be any one of a suspended state, a hibernation state, and a soft-off state. The computer sets a reference value of the power consumption of the system and measures the power consumption of the system. The power consumption of the system in the power-on state depends on operating states of a processor or various devices. The computer determines a changeover condition by comparing the power consumption of the system with the reference value. The computer changes over to the power-saving state when the changeover condition is satisfied.

By determining a changeover timing from the power-on state to the power-saving state on the basis of the power consumption of the system, it is possible to more reasonably achieve balance of the ability to quickly resume and reduction of power consumption, in comparison with the determination based on the duration of the utilization-rate idle state. This is effective in a system having lower power consumption than that in the utilization-rate idle state. The changeover condition can be established in a state where the average power consumption calculated with a predetermined observation time is lower than a first reference value. The power state does not change over to the power-saving state until the predetermined observation time elapses. Accordingly, when the average power consumption is smaller than the first reference value for the observation time, the changeover condition is established.

By setting the changeover condition to be established when the average power consumption value is smaller than the first reference value and larger than a second reference value, it is possible to maintain the power-on state to give priority to the ability to quickly resume when the average power consumption value is smaller than the second reference value.

The power-on state may be maintained, but the power-on state may change over to the power-saving state when a predetermined time passes after the average power consumption value becomes smaller than the second reference value. The changeover condition may be set to be established in a shorter time after the average power consumption value becomes smaller than the first reference value when the average power consumption value is large, in comparison with the case where the average power consumption value is small. In this case, it is possible to more reasonably achieve balance of ability to quickly resume for changeover to the power saving state for a shorter time as the average power consumption value is larger with reduction of power consumption.

In the power-on state, when the system stops the supply of power to the devices in the idle state, the power consumption of the system is further reduced. In the power-on state, when processes generated by a predetermined program are forcibly suspended and the supply of power to the devices associated with the forcibly-suspended processes is stopped, the power consumption of the system in the power-on state is greatly reduced.

According to a second aspect, there is provided a method of balancing ability to quickly resume and reduction of power consumption in a computer operating in a power-on state. The computer sets a power idle state for a predetermined range of power consumption of a system. The computer measures the power consumption of the system. The computer recognizes that the system changes over to the power idle state. The computer changes over to a power-saving state when it is determined that the system stays in the power idle state. The computer recognizes a depth of the power idle state on the basis of the magnitude of the power consumption and can set a time for changing over to the power-saving state to become longer as the depth becomes deeper.

According to one embodiment, it is possible to provide a method of changing over a computer from a power-on state to a power-saving state. In addition, according to one embodiment, it is possible to provide a method of balancing ability to quickly resume and reduction of power consumption. Moreover, it is possible to provide a computer and a computer program for realizing the method.

DETAILED DESCRIPTION

Hardware Configuration and Power State

Figure 1:
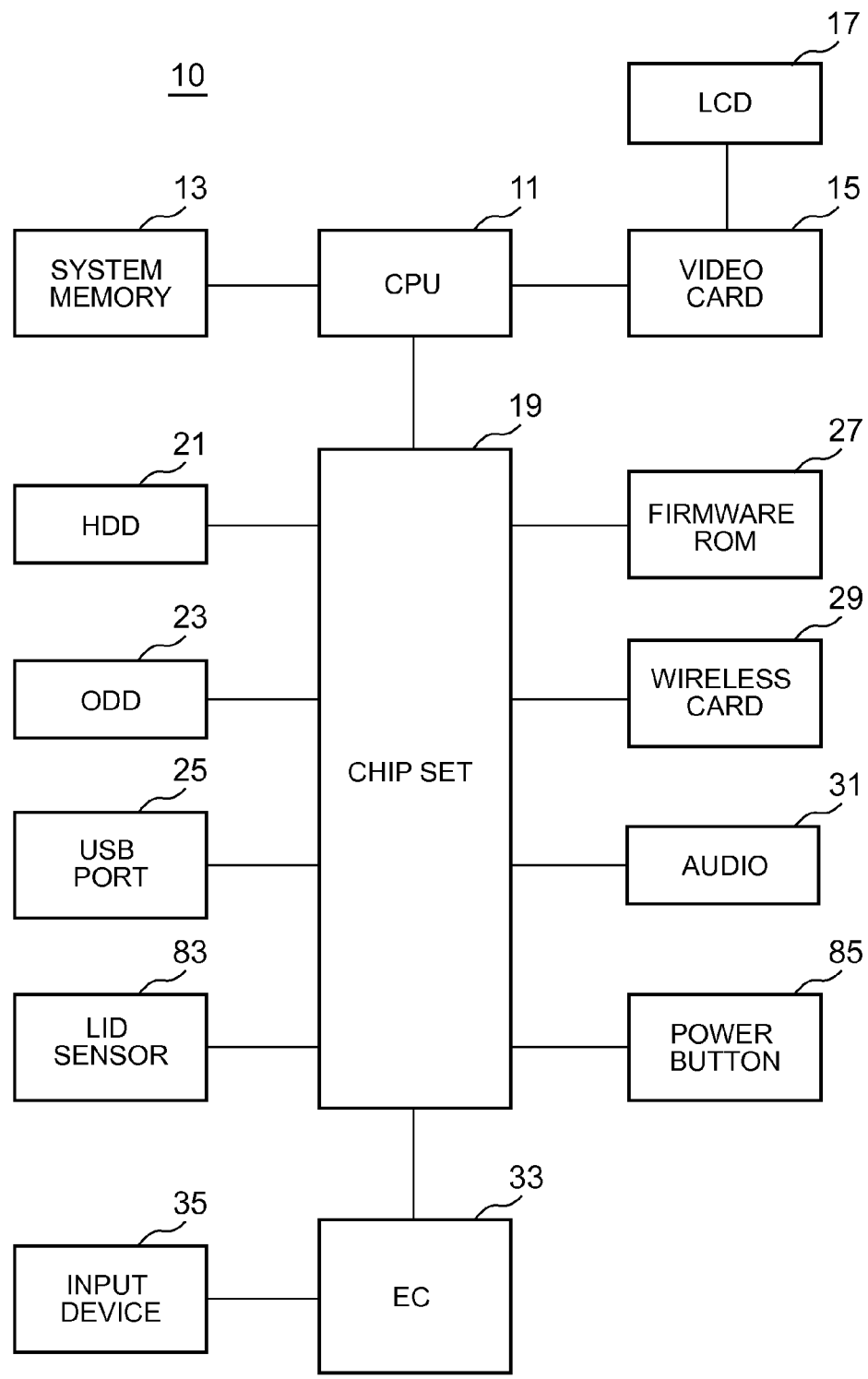
FIG. 1 is a functional block diagram illustrating principal hardware constituting a system of a laptop PC according to an embodiment.
Figures 2, 3:
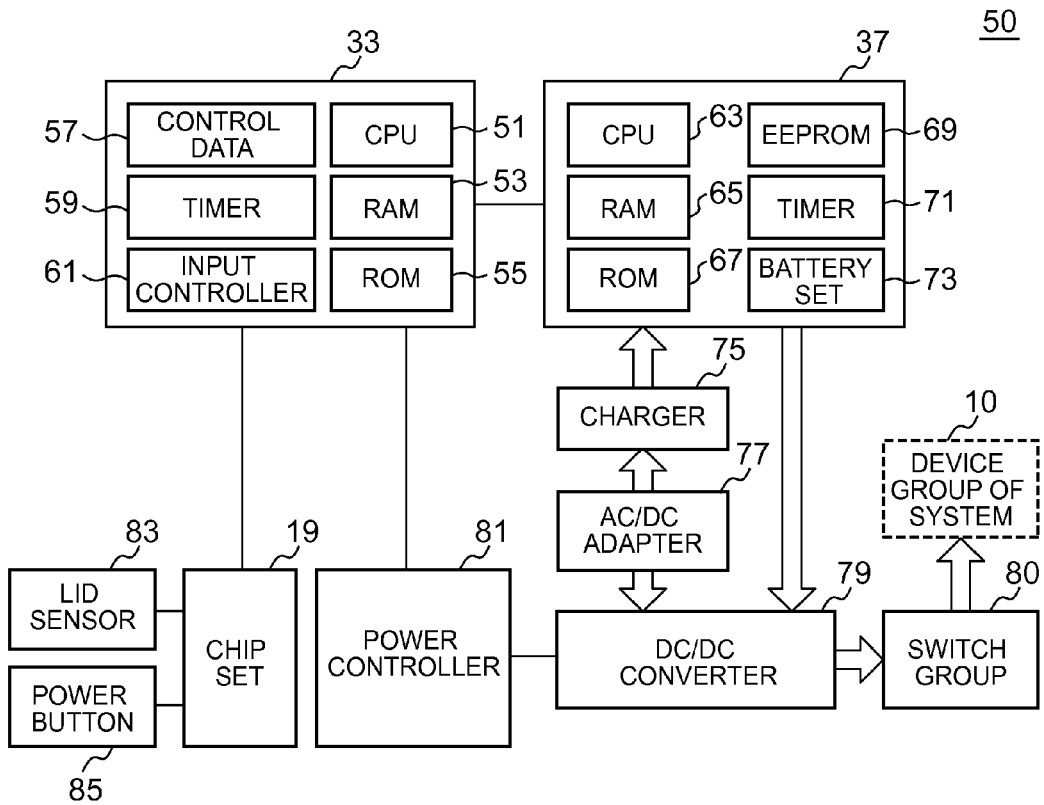
FIG. 2 is a diagram illustrating power states of a system 10, a CPU 11, and a device group of the laptop PC.
FIG. 3 is a functional block diagram illustrating a configuration of a power block 50 of the laptop PC.

FIG. 1 is a functional block diagram illustrating principal hardware constituting a system 10 of a laptop PC according to an embodiment. FIG. 2 is a diagram illustrating power states of a system 10, a CPU 11, and a device group. FIG. 3 is a functional block diagram illustrating a configuration of a power block 50 of the laptop PC. In the entire specification, the same elements will be referenced by the same reference numerals. The laptop PC having the system 10 mounted thereon includes a system casing having a keyboard mounted on the surface thereof and having electronic devices built therein and an LCD casing having an LCD 17 therein. The LCD casing is configured to be opened and closed with respect to the system casing.

In FIG. 2, the system 10 changes over to an S0 state corresponding to a power-on state defined in the ACPI (Advanced Configuration and Power Interface) standard, S1 to S4 states corresponding to a sleep state, and an S5 state corresponding to a soft-off state. The system can dispatch a user mode thread generated by an application to the CPU 11 and execute the user mode thread in the power-on state.

In this embodiment, only the S3 state (suspended state) in which the contents of a system memory 13 are retained and the S4 state (hibernation state) in which system contexts are stored in a hard disk drive (HDD) 21 are employed as the sleep state, but other sleep states may be provided. The sleep state includes the S4 state to which a UEFI (Unified Extensible Firmware Interface) firmware stored in a firmware ROM 27 automatically changes over the power state when a predetermined time elapses after the OS changes over the power state to the S3 state.

In the sleep state, in the order of the suspended state, the hibernation state, and the soft-off state, the power consumption of the system 10 becomes smaller but the latency time for returning to the power-on state becomes longer. In the power-on state, the CPU 11 changes over to a C0 state corresponding to an active state or C1 to Cn states corresponding to the sleep state. The larger the magnitude of n becomes, the lower the power consumption becomes and the longer the latency time becomes. The CPU 11 can perform processes only in the active state. The CPU 11 in the sleep state can perform the processes after returning to the active state when an interruption is made. The CPU 11 changes over to a stopped state by stopping the supply of power in the suspended state, the hibernation state, or the soft-off state.

The devices dynamically change over to a D0 state corresponding to the active state when the system is in the power-on state, D1 and D2 states corresponding to the sleep state, and D3hot and D3off states corresponding to the stopped state. In the order of the D1 state, the D2 state, the D3hot state, and the D3off state, the power consumption of the devices becomes smaller but the latency time for returning to the active state becomes longer. Many devices change over to the sleep state or the stopped state when the system is basically in the suspended state or the hibernation state, and change over to the D3off state when the system is in the soft-off state. Some devices thereof may retain the D0 state when the system is in the sleep state.

The D1 state to the D3hot state may not be defined for some devices, and what power state the power state changes over to from the power-on state differs depending on the devices. The devices in the power-on state may change over to a predetermined sleep state through independent algorithms, but many devices in the power-on state change over to the D3off state in the power management proposals by the Intel® company or the Microsoft® company and thus the power consumption of the system 10 is reduced more greatly than that in the conventional art.

The hardware configuration of a laptop PC can be easily understood by those skilled in the art and thus will be described in brief. A system memory 13, a video card 15, and a chip set 19 are connected to the CPU 11. An LCD 17 is connected to the video card 15. The CPU 11 can lower a set of operating frequency and operating voltage to a predetermined value depending on the utilization rate in the active state, for example, by employing a technique such as SpeedStep (registered trademark) of the Intel® company.

The CPU 11 changes the depth of the sleep state by performing lowering of a core voltage, stopping of a core clock, stopping of a PLL, flash of a cache to the system memory 13 or a dedicated memory, and the like depending on a fall in utilization rate, and changes over to the active state with the latency time corresponding to the depth to execute a command when an interruption is made. The OS monitors the operation state or the utilization rate of the CPU 11 and controls the depth of the sleep state through the use of the chip set 19.

The chip set 19 includes controllers of a USB (Universal Serial Bus), an ATA (AT Attachment), an SPI (Serial Peripheral Interface) bus, a PCI (Peripheral Component Interconnect) bus, a PCI-Express bus, an LPC (Low Pin Count) bus, and the like and is connected to plural devices. In FIG. 1, an HDD 21, an optical disc drive (ODD) 23, a USB port 25, a firmware ROM 27, a wireless card 29, and an audio device 31 are illustrated as examples of the devices. A lid sensor 83 and a power button 85 are also connected to the chip set 19.

The firmware ROM 27 stores new system firmware (hereinafter, referred to as UEFI firmware) used instead of a BIOS defined by the UEFI forum or in addition to the BIOS. An embedded controller (EC) 33 is also connected to the chip set 19. An input device 35 such as a keyboard, a pointing device, and a touch pad is connected to the EC 33. As illustrated in FIG. 3, the EC 33 is a microcomputer including a CPU 51, a RAM 53, a ROM 55, an EEPROM 57, a timer 59, and a controller 61 of the input device.

The ROM 55 stores firmware for controlling the power state in the power idle state according to one embodiment. The EEPROM 57 stores control data such as a reference value or a set value used to control the power state in the power idle state which will be described with reference to FIGS. 6 to 8. The EC 33 can execute a program for managing operation environments of the laptop PC such as temperature or power independently of the CPU 11.

A power controller 81 and a battery unit 37 are connected to the EC 33. The power controller 81 is connected to a DC/DC converter 79. The power controller 81 is a wired logic digital control circuit (ASIC) for controlling the DC/DC converter 79.

The battery unit 37 includes a CPU 63, a RAM 65, a ROM 67, an EEPROM 69, a timer 71, and a battery set 73. The battery unit 37 can be constructed as a battery pack and can be mounted on a bay of a system casing or can be mounted on a substrate and received in the system casing. The CPU 63 performs calculation of remaining capacity of the battery set 73, management of charging and discharging current and charging and discharging voltage, and the like.

When the battery set 73 supplies power to the system 10, the discharging power is the power consumption of the system 10. The EC 33 periodically (for example, every two seconds) receives the discharging current of the battery set 73 from the CPU 63 and calculates the power consumption P of the system 10. The EC 33 calculates average power consumption Pav of the system 10 by averaging the power consumption P over the observation time s described with reference to FIGS. 6 to 8. The EC 33 may periodically receive the discharging power from the CPU 63. Alternatively, the CPU 63 may calculate the average power consumption Pav of the system 10 and may send the calculated average power consumption to the EC 33.

The DC/DC converter 79 includes plural modules that operate independently, converts a DC voltage supplied from an AC/DC adapter 77 or the battery unit 37 into plural voltages necessary for operating the system 10, and supplies power to the devices on the basis of power supply classifications defined depending on the power states. In the power-on state, the switch group 80 stops the supply of power to the devices in the idle state instructed via the EC 33 from the chip set 19 or the devices instructed in the doze mode. The lid sensor 83 detects the opening and closing state of the LCD casing with respect to the system casing. The power button 85 is mounted on the system casing so as to be physically coupled thereto as a body, and is pressed by a user so as to operate the power state.

The lid sensor 83 and the power button 85 send a signal to the chip set 19 and generate an event for changing the power state of the system 10. The lid sensor 83 generates a changeover event for changing over to the doze mode when the LCD casing is closed with respect to the system casing, and generates a return event for resuming the power state from the doze mode to the normal mode when it is opened. The EC 33 changes the power state of the system 10 when the chip set 19 generates an event. The AC/DC adapter 77 supplies power to the DC/DC converter 79 or a charger 75. The charger 75 charges the battery set 73.

Configuration of Software

Figure 4:
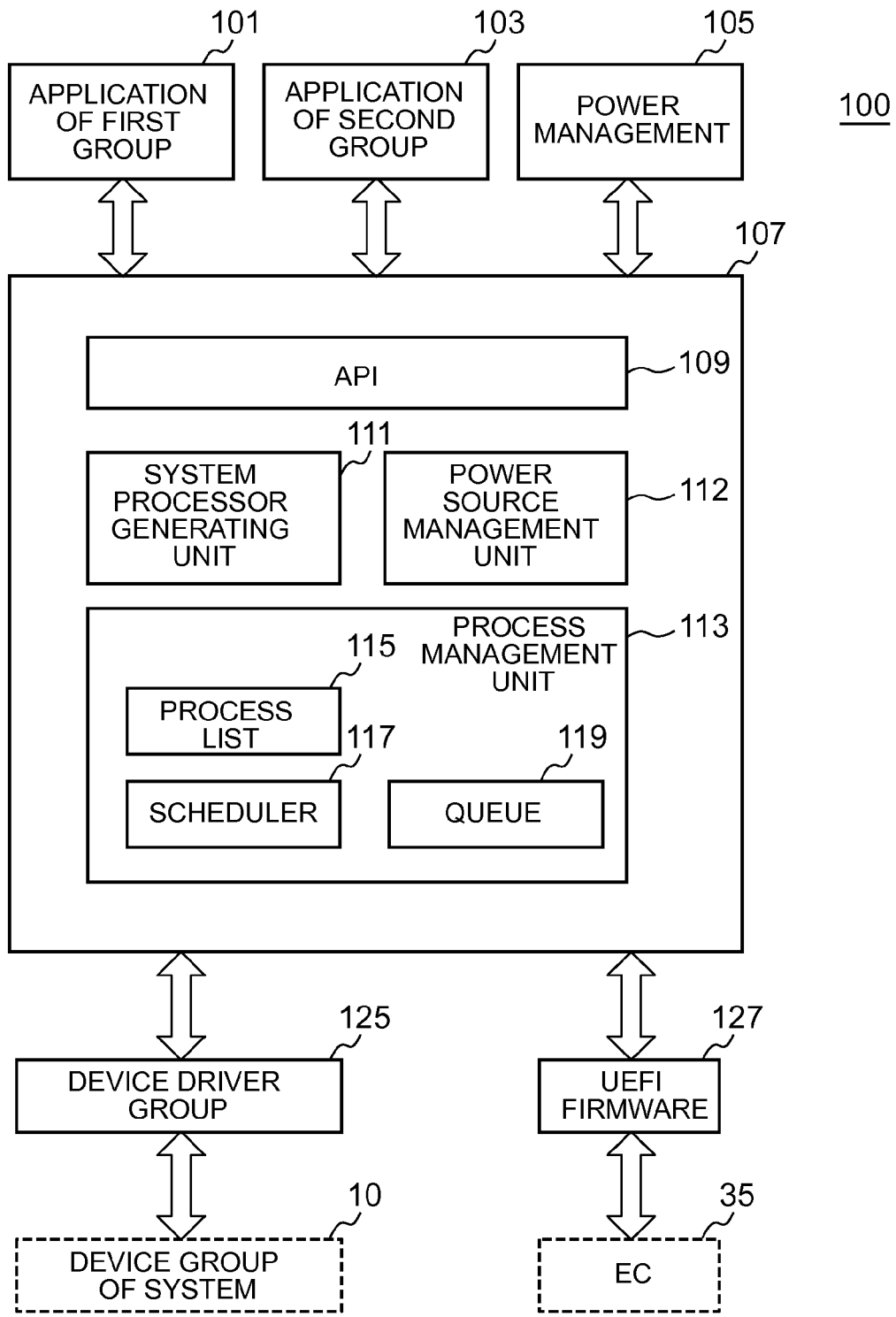
FIG. 4 is a functional block diagram illustrating a configuration of principal software constituting the system of the laptop PC.

FIG. 4 is a functional block diagram illustrating the configuration of principal software 100 constituting the system 10. The software 100 is stored in the HDD 21 and is loaded onto the system memory 13 and is executed by the CPU 11. The software 100 supports the doze mode (see FIG. 5) which is an operation mode of the power-on state. An application of a first group 101 is a program group associated with a specific function or a basic function which needs to be maintained even in the doze mode. For example, the specific function includes a chat program or a program necessary for maintaining wireless connection. The basic function includes a function of monitoring the charged state of the battery set 73, a function of automatically changing over to the sleep state when the remaining capacity of the battery set 73 is lowered and preventing loss of data developed in the system memory 13, and a function of managing the temperature in the casing.

An application of a second group 103 is a program which is not stopped even in the doze mode and an example thereof is an antivirus program. A power management program (PM program) 105 is a program for realizing power management in the doze mode and the power idle state according to this embodiment. The PM program 105 performs detection of a changeover event to the doze mode, control of processes in the doze mode, detection of a return event to the normal mode, and returning to the normal mode. A screen for causing a user to select the applications of a first group 101 or causing a user to set the observation time or the time of timeout so as to control the power state in the power idle state is displayed on the LCD 17.

The PM program 105 requests the OS 107 to change over the system 10 to the sleep state when receiving notification indicating that the changeover condition to the suspended state is established while the system 10 stays in the power idle state from the EC 33 via the OS 107. The PM program 105 can recognize the applications of the first group 101 and the applications of the second group 103 and can determine the processes of the programs to be forcibly suspended. The PM program 105 holds a black list of programs that should not be changed over to the sleep state in controlling the power state in the power idle state. The PM program 105 holds off the changeover to the sleep state when the processes of the program described in the black list are being executed at the time of receiving the notification indicating that the changeover condition is established from the EC 33 via the OS 107.

The OS 107 includes an API 109, a system process generating unit 111, a power source managing unit 112, and a process managing unit 113. The OS 107 changes over the CPU 11 to the sleep state with a predetermined depth depending on the utilization rate and the operating state of the CPU 11. In application of the present embodiments, it is preferable that the OS 107 sets the depth of the sleep state of the CPU 11 and the device group to be as large as possible in the power-on state. The OS 107 may be, for example, Windows (registered trademark) 7 or 8.

The system process generating unit 111 generates system processes for executing various programs constituting the OS 107. The power source managing unit 112 monitors the utilization rate of the CPU 11, the command executing state, events associated with the power source, and the like and sends a notification for controlling the devices to the device driver or other modules. The power source managing unit 112 includes an idle timer for counting the duration of the utilization-rate idle state.

The process managing unit 113 includes a process list 115, a scheduler 117, and a queue 119 and manages processes and threads generated by the applications and the system process generating unit 111. The process list 115 registers all processes currently generated by the system 10. The scheduler 117 performs preemptive task switching on a generated thread using a predetermined algorithm. In the queue 119, processes changed over to any one of an executable state, an execution waiting state, and a forcibly-suspended state are registered in correlation with the states thereof.

A device driver group 125 is configured to correspond to the device group of the system 10. The device driver group 125 transmits a changeover event from the normal mode to the doze mode and a return event from the doze mode to the normal mode, which are generated by the lid sensor 83, to the OS 107. The device driver group 125 includes a queue for registering an I/O request packet performed on the HDD 21 by a thread which cannot be forcibly suspended in the doze mode.

State Changeover of Power State

Figure 5:
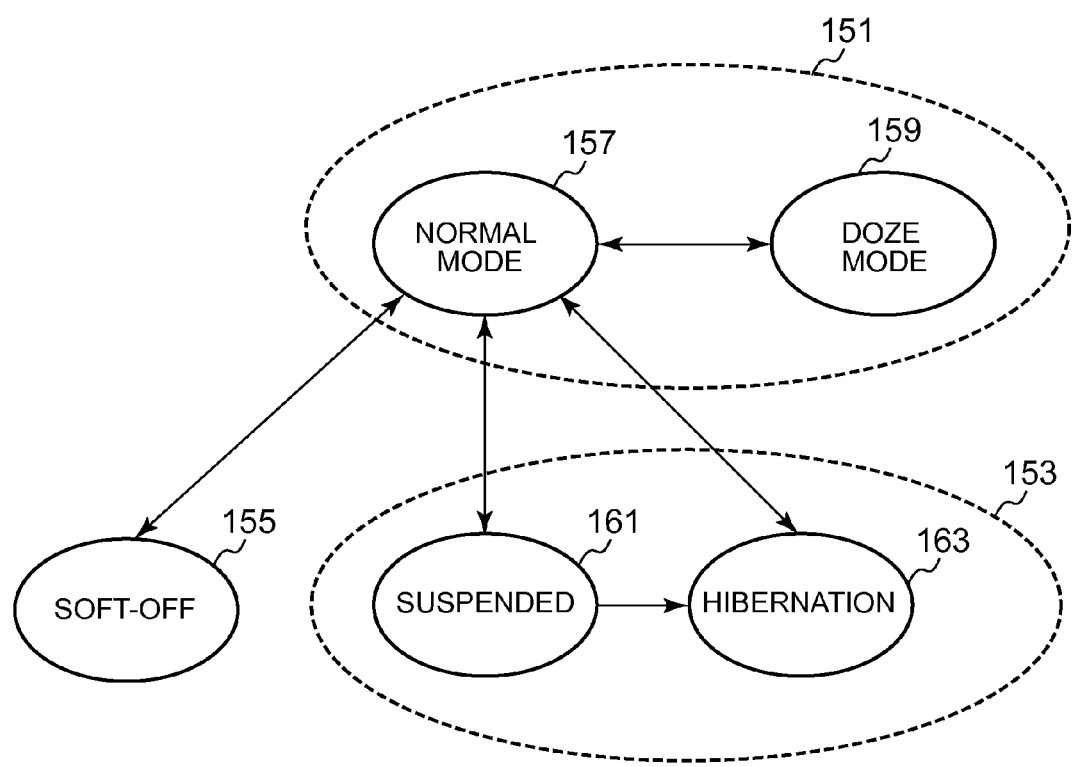
FIG. 5 is a diagram illustrating changeover of the power state of the system 10.

FIG. 5 is a diagram illustrating changeovers of power states of the system 10. The power state of the system 10 includes a power-on state 151, a sleep state 153, and a soft-off state 155. The power-on state 151 includes a normal mode 157 and a doze mode 159. The sleep state 153 and the soft-off state 155 are both called a power saving state. The normal mode 157 is a normal operation mode in the power-on state 151 which is contrastive to the doze mode 159 and means an operation mode in which the PM program 105 does not limit the execution of processes or the supply of power to the devices.

In the doze mode 159, the processes registered in the process list 115 are classified into a forcibly-suspended group and an I/O monitored group. Processes generated by applications other than the application of the first group 101 and the application of the second group 103 and the system processes which are not necessary for the execution of the application of the first group 101 or the application of the second group 103 are classified into the forcibly-suspended group.

The PM program 105 registers the processes of the forcibly-suspended group in the queue 119 and changes over the processes to the forcibly-suspended state. Since the processes generated by most applications change over to the forcibly-suspended state, the CPU 11 is lowered in utilization rate and can change over to a deep sleep state 153. The processes of the I/O monitored group are registered in the queue 119 so as to change over to the executable state or the execution waiting state similarly to the normal mode 157.

The CPU 11 performs the processes registered in the queue 119 on the basis of an algorithm of the scheduler 117. By registering the I/O request packet for causing the processes of the I/O monitored group to I/O-access the HDD 21 in the queue of the device driver group 125 during the doze mode 159 and causing the process completion notification of the I/O request packet not to return to the requested process, the corresponding process can be changed over to the execution waiting state. As a result, the HDD 21 can spin down or stop the supply of power during the doze mode 159.

The PM program 105 can stop the supply of power to the devices not associated with the functions that need to be maintained during the doze mode 159. The PM program 105 operates the switch group 80 via the chip set 19 and stops the supply of power to a predetermined device group. Examples of the device group to which the supply of power is stopped in one embodiment include the HDD 21, an ODD 23, a USB port 25, an audio device 31, and an LCD 17. In the doze mode 159, since the utilization rate of the CPU 11 is lowered, the power consumption thereof is reduced, and the supply of power to many devices is stopped, the power consumption of the system 10 is greatly lowered in comparison with the normal mode 157.

In addition, in the doze mode 159, even when the CPU 11 is in the sleep state and returns to the normal mode 157, the CPU can return to the active state with a short latency time, can release the forcibly-suspended state, and can perform all the processes registered in the process list 115 for a short time. The changeover from the normal mode 157 to the doze mode 159 is performed using a changeover event generated when the LCD casing is closed and the lid sensor 83 reports the closing of the LCD casing. The return from the doze mode 159 to the normal mode 157 can be performed using a return event generated when the LCD casing is opened for a predetermined time in the doze mode 159 and the lid sensor 83 reports the opening of the LCD casing.

When the LCD casing is not opened for a predetermined time, the power-on state 151 is maintained or the doze mode 159 is changed over to the suspended state 161 or the hibernation state 163 using the method of controlling the power state in the power idle state according to certain embodiments. The changeover from the normal mode 157 to the suspended state 161 or the changeover to the hibernation state 163 or the soft-off state is performed on the basis of the operation of the GUI, the pressing of the Fn key on the keyboard, the pressing of the power button 85, or the operation of the lid sensor 83. When the power consumption of the system 10 is reduced, the method of controlling the power state in the power idle state according to one embodiment is performed. The changeover from the suspended state 161, the hibernation state 163, or the soft-off state 155 to the normal mode 157 is performed on the basis of the pressing of the power button 85 or the operation of the lid sensor 83.

The changeover from the suspended state 161 to the hibernation state 163 is automatically performed by the UEFI firmware without recognition by the OS when the UEFI firmware determines that the time in the suspended state 161 is longer than a predetermined value. A user sets the time in the suspended state 161 through the use of the PM program 105. Regarding the return to the normal mode 157 in this case, the UEFI firmware temporarily returns the power state to the suspended state 161 and then the OS returns the power state to the normal mode 157, on the basis of the operation of the lid sensor 83 or the pressing of the power button 85.

Power Idle State and Suspension Control

In certain embodiments, a concept such as the power idle state based on the power consumption of the system 10 is introduced instead of the conventional utilization-rate idle state so as to determine the timing at which the system 10 is changed over from the power-on state 151 to the sleep state 153 or the soft-off state 155. The power idle state means a state in which the power consumption P or the average power consumption Pav of the system 10 is equal to or less than a predetermined upper limit value Pih. The power idle state means a state in which the power consumption P or the average power consumption Pav of the system 10 lies between the upper limit value Pih and a lower limit value Pil. By way of example and without limitation, when the maximum power consumption Pmax of the system is 90 W, the upper limit value Pih of the power idle state is set to 5 W and the lower limit value Pil is set to 500 mW.

The difference between the power consumption P and the average power consumption Pav is based on the difference in the averaging time when calculating the power. The power consumption P is defined as a value measured from discharge data by the battery unit 37 or a value calculated by the EC 33 acquiring the discharge data from the battery unit 37. The average power consumption Pav is defined as average power consumption during an observation time s to be described later. The time for averaging the average power consumption Pav is longer than the time for averaging the power consumption P. For example, the averaging time is set to 2 seconds for the power consumption P and is set to 10 minutes for the average power consumption Pav. The power consumption P is a value close to instantaneous power.

The range of the power idle state can include the utilization-rate idle state, but reaches a range of less than the power consumption P of the system 10 in the utilization-rate idle state. For example, the upper limit value Pih can be set to the power consumption P in the utilization-rate idle state when the power management proposed by the Intel® company or the Microsoft® company is not utilized. The lower limit value Pil can be set to a value, by way of example, equal to or lower than five times the power consumption P of the system in the suspended state.

First Method of Controlling Power State in Power Idle State

Figure 6:
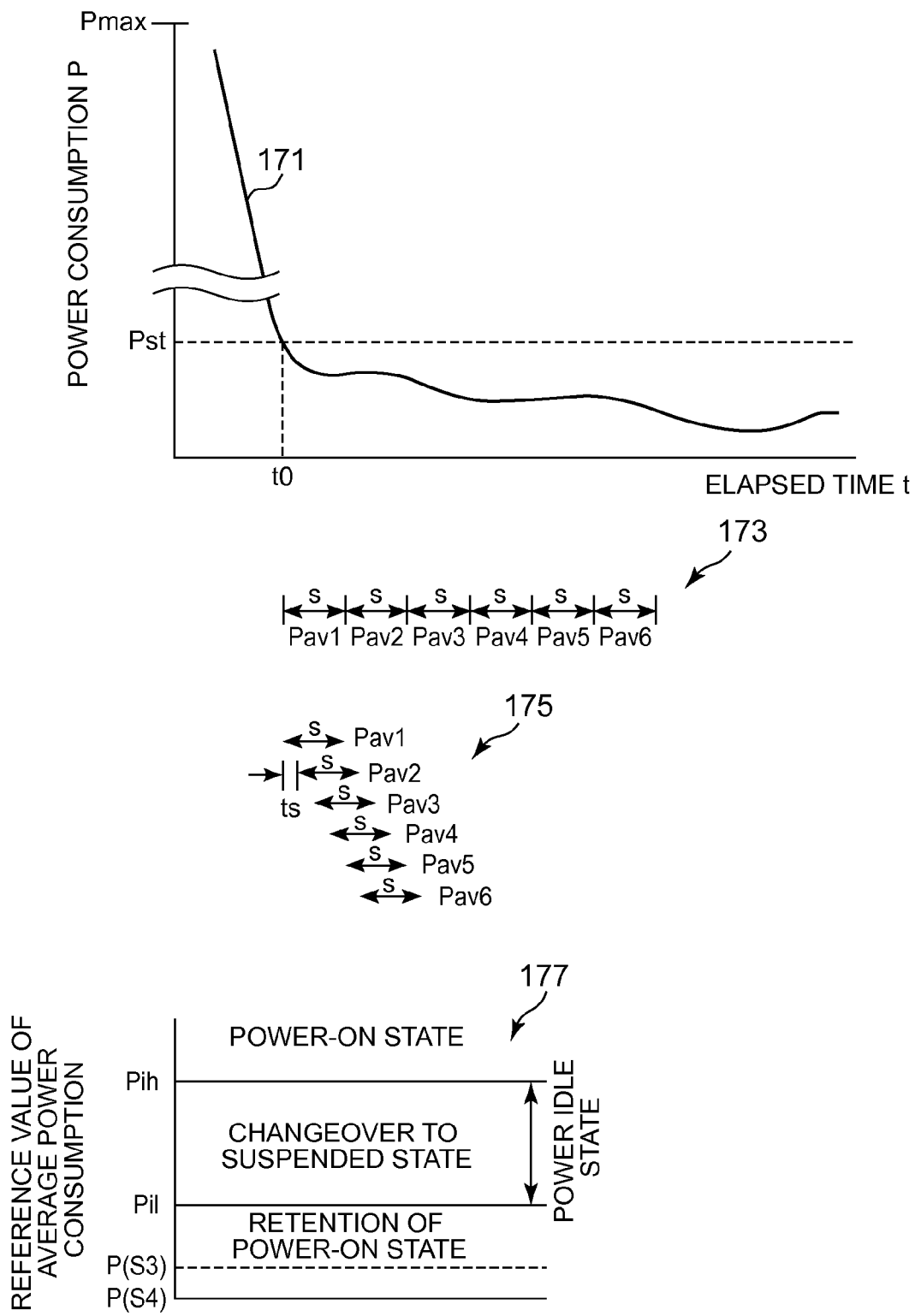
FIG. 6 is a diagram illustrating a method of controlling the power state of the system 10 in a power idle state.

The method of controlling the power state of the system 10 in the power idle state will be described below with reference to FIG. 6. In FIG. 6, a line 171 shows a state in which the power consumption P of the system 10 in the power-on state 151 is lowered to start power Pst at time t0 and stays being equal to or less than Pst. The start power Pst can be set as the upper limit value Pih of the power idle state. When the utilization-rate idle state is set using the upper limit value Pih, time t0 can be set to the time point at which the OS 107 recognizes the changeover of the system 10 to the utilization-rate idle state. The power consumption P of the system 10 includes power consumed by elements constituting the power block 50.

At time t0, the EC 33 activates the timer 59 and starts monitoring the power idle state of the system 10. The EC 33 resets the timer 59 and stops monitoring the power idle state, when the power consumption P returns to the start power Pst or higher. The EC 33 sets a time window 173 in which the observation time s is continuous on the time axis or a time window 175 in which the observation time s is shifted in the elapsed time t direction with a sampling period is so as to calculate a time shift average on the basis of the time counted by the timer 59.

The EC 33 calculates the average power consumption Pav for each observation time s on the basis of the acquired power consumption P. The EC 33 sets a reference value 177 for the average power consumption Pav. The reference value 177 includes the upper limit value Pih and the lower limit value Pil of the power idle state. The EC 33 considers that it is in a state where the system 10 cannot be stopped and maintains the power-on state, when it is determined that the average power consumption Pav calculated for each observation time s is larger than the upper limit value Pih.

The EC 33 changes over to the suspended state 161 with a higher weight in the reduction of power consumption of the battery than the ability to quickly resume, when it is determined that the average power consumption Pav lies between the upper limit value Pih and the lower limit value Pil. When the average power consumption Pav is equal to or less than the lower limit value Pil, the difference from the average power consumption P (S3) in the suspended state 161 is small and thus the power consumption reducing effect of the battery is small even when the power state is changed over to the suspended state 161. The EC 33 maintains the power-on state 151 with a priority given to the ability to quickly resume, when it is determined that the average power consumption Pav is equal to or less than the lower limit value Pil. In addition, for example, the power consumption P (S3) in the suspended state 161 is 110 mW and the power consumption P (S4) in the hibernation state 163 is 60 mW.

The start power Pst, the sampling period ts, the upper limit value Pih, and the lower limit value Pil can be registered in advance in the EEPROM 57. The observation time s can be input by a user through the use of the GUI provided by the PM program 105 and can be registered in the EEPROM 57 by the UEFI firmware. In the method described with reference to FIG. 6, while the time window of the observation time s is set, the system 10 does not change over to the suspended state and thus the changeover condition is established when the system 10 changes over to the power idle state during the observation time s. In one embodiment, instead of calculating the average power consumption Pav, an elapsed time with a start time when the power consumption P is changed to be equal to or less than the upper limit value Pih of the power idle state may be counted by the EC 33 and the changeover condition may be considered to be established when it is determined that the power consumption P stays in the power idle state only for the observation time s.

[Second Method of Controlling Power State in Power Idle State]

Figure 7:
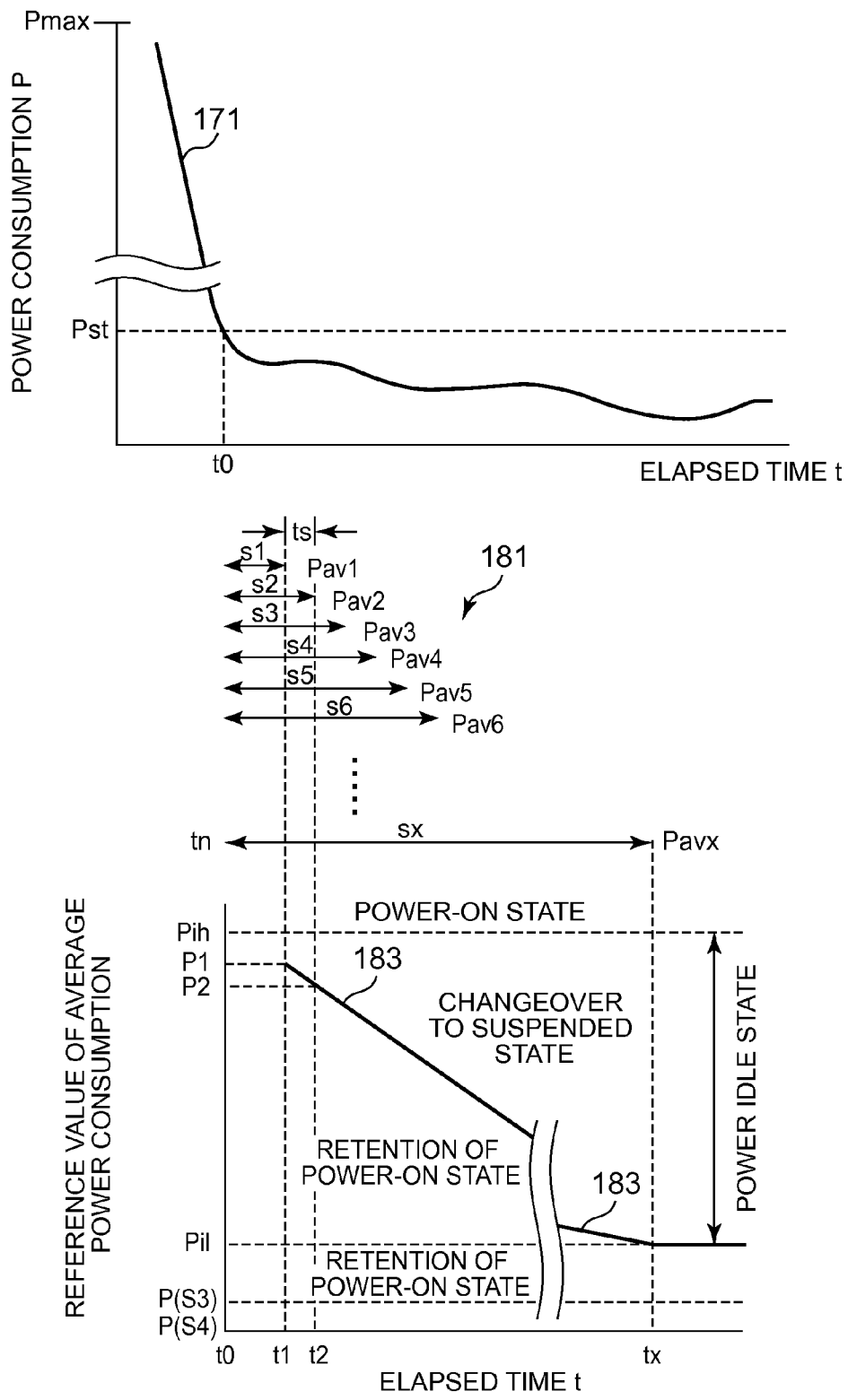
FIG. 7 is a diagram illustrating a reference value used to control the power state of the system 10 in the power idle state.

It can be said that the smaller the power consumption P of the system 10 in the power idle state becomes, the deeper the depth of the power idle state becomes. A method of controlling the power state while changing the time until the changeover to the suspended state 161 depending on the depth of the power idle state will be described below with reference to FIGS. 7 and 8. In FIG. 7, the power consumption P of the system 10 is lowered like the line 171 illustrated in FIG. 6.

Figure 8:
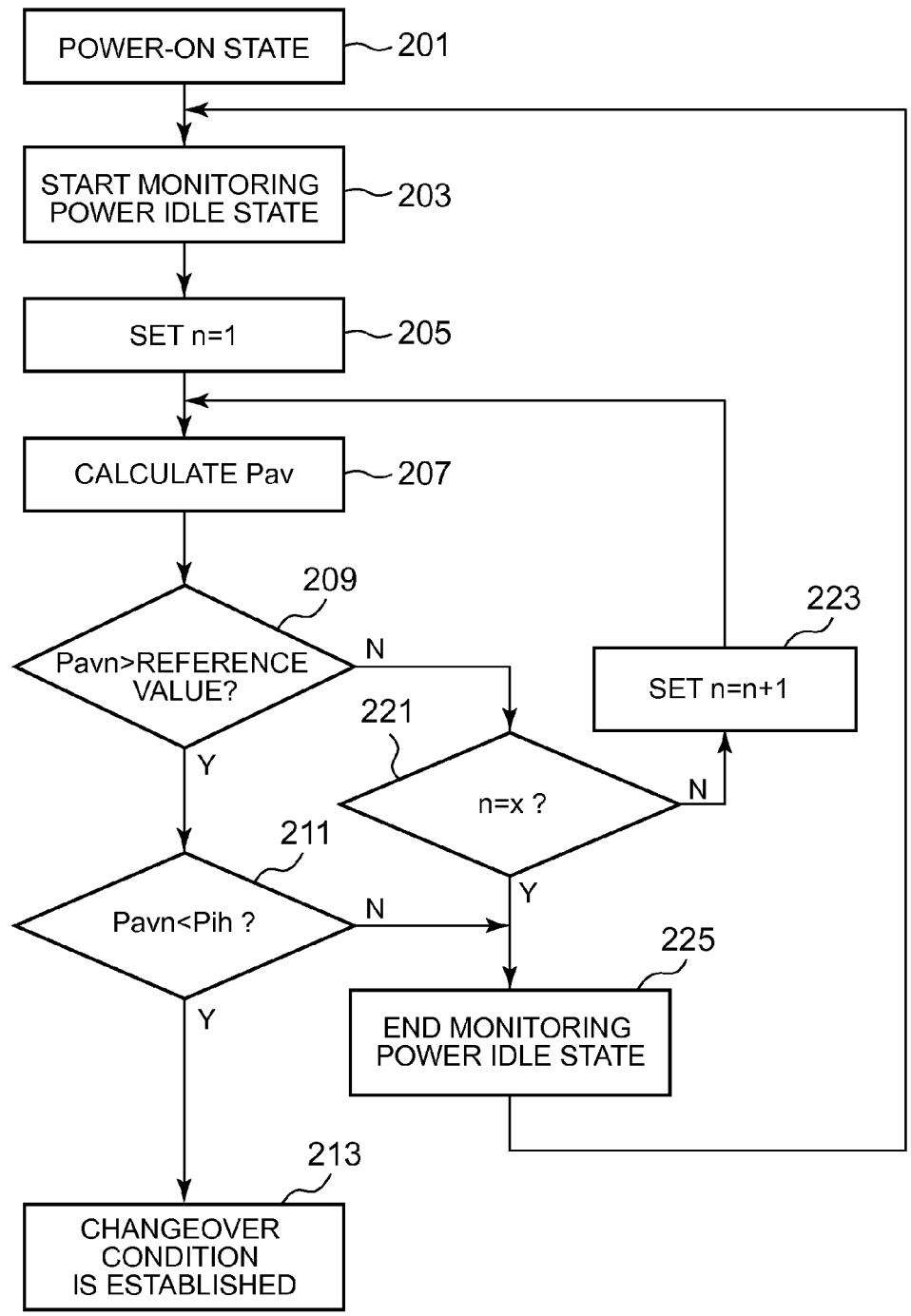
FIG. 8 is a flowchart illustrating a process flow of controlling the power state of the system 10 in the power idle state.

In block 201 illustrated in FIG. 8, the power consumption P of the system 10 in the power-on state 151 is lowered to the start power Pst at time t0. In block 203, the EC 33 activates the timer 59 at time t0 to start monitoring the power idle state. The EC 33 sets time windows 181 from the observation time s1 to the observation time sx in which the observation time from time t0 increases by the sampling period is on the basis of the time counted by the timer 59, and starts calculating the average power consumption value Pav for each time window.

A line 183 represents a reference value having a characteristic that the average power consumption is lowered from the reference power value P1 to the lower limit value Pil in the elapsed time t. The reference value of the line 183 is set so that the changeover condition is established such that the smaller the average power consumption value Pav of the system 10 becomes, the longer time the system stays in the power idle state. The reference power value P1 is set to a value slightly smaller than the upper limit value Pih of the power idle state. In blocks 205 and 207, the EC 33 first calculates the average power consumption value Pav1 in the observation time s1 from time t0 to time t1. In block 209, the EC 33 compares the reference value P1 corresponding to time t1 at which the observation time s1 terminates with the average power consumption value Pav1. When the average power consumption value Pav1 is larger than the reference value p1, the process flow goes to block 211.

In block 211, the EC 33 compares the average power consumption value Pav1 with the upper limit value Pih. The process flow goes to block 225 when the average power consumption value Pav1 is larger than the upper limit value Pih, and it is determined that the changeover condition is established in block 213 when the average power consumption value is smaller than the upper limit value. In block 221, the EC determines whether the time window 181 is the final observation time sx.

When it is determined in block 209 that the average power consumption value Pavx calculated in the final observation time sx is smaller than the reference value, it means that the average power consumption value Pav is smaller than the lower limit value Pil of the power idle state. When the time window is the final observation time sx, the EC 33 ends monitoring the power idle state in block 225 and the process flow returns to block 203. As a result, the power-on state 151 is maintained. When the time window is not the final observation time sx in block 221, the average power consumption value Pav2 is calculated with the time window of the next observation time s2 in blocks 223 and 207.

In this method, the smaller the average power consumption value Pav becomes and the deeper the depth of the power idle state becomes, the longer the time for maintaining the power-on state 151 after the changeover to the power idle state becomes. The larger the average power consumption value Pav is and the smaller the depth is, the shorter time the changeover to the suspended state 161 is performed. Accordingly, it is possible to reasonably balance the ability to quickly resume and the reduction of the power consumption of the battery. The maximum observation time sx can be set, for example, to two hours. The reference value of the line 183 can be stored in the form of a data table or a numerical expression in the EEPROM 57. The line 183 is exemplified as a straight line, but may be a curve such as an exponential function. The characteristic of the line 183 can be defined on the basis of a balance policy of the trade-off relationship of the ability to quickly resume and the reduction of the power consumption of the battery.

Instead of the time windows 181, the time windows 173 and 175 of FIG. 6 formed with the same observation time s may be used. The methods of controlling the power idle state which are described in the order of FIG. 6, FIG. 7, and FIG. 8 may be also applied to a case where the changeover destination from the power-on state is the hibernation state 163 or the soft-off state 155 in addition to the suspended state 161. When the UEFI firmware automatically changes over to the hibernation state 163 in a predetermined time after changeover to the suspended state 161, the predetermined time can be set to zero and the power state can be changed over to the hibernation state 163 just after the changeover to the suspended state 161.

[Procedure of Changeover from Doze Mode to Suspended State]

Figure 9:
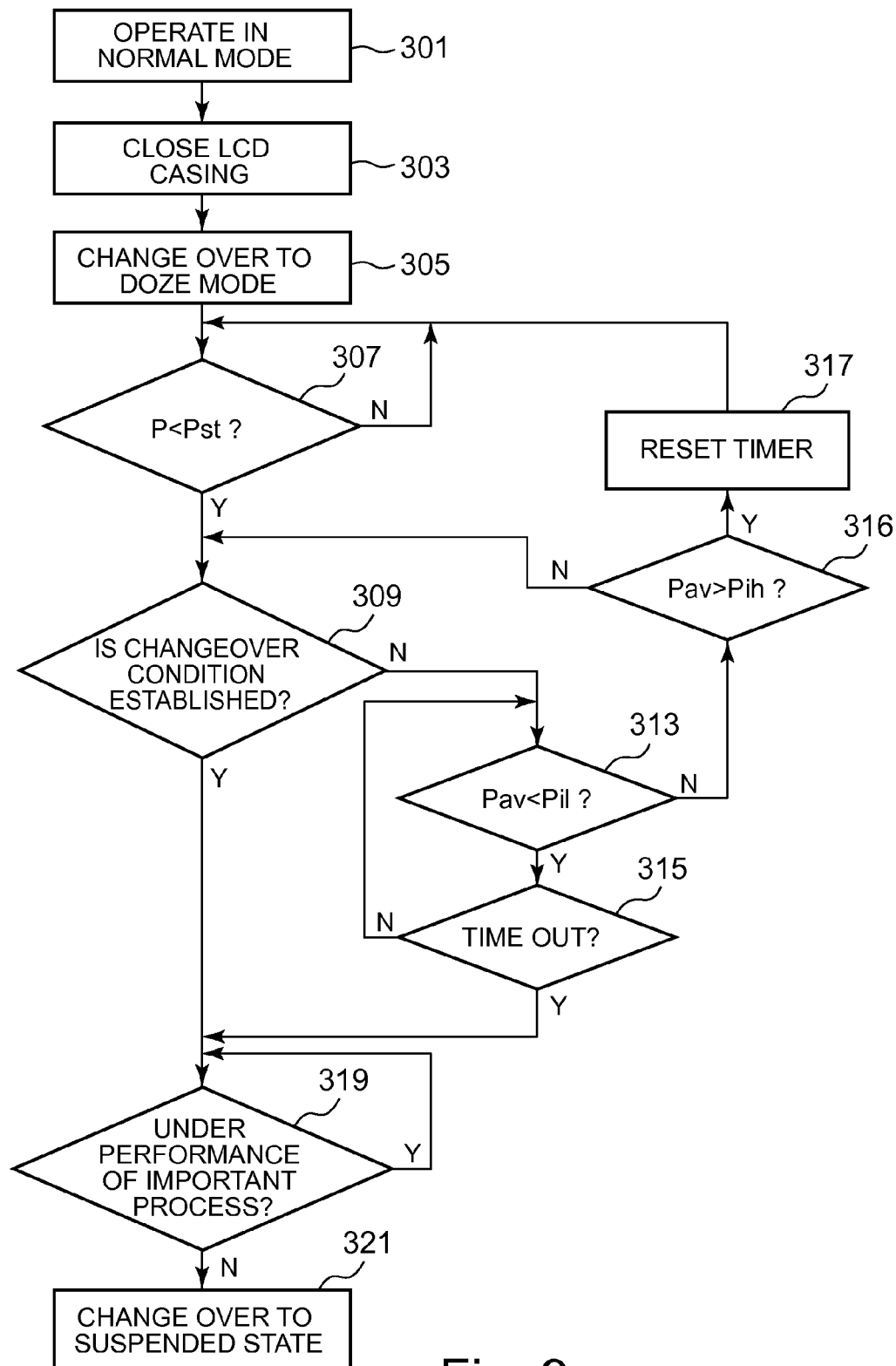
FIG. 9 is a flowchart illustrating a process flow of changeover from a doze mode to a suspended mode.

A procedure of changing over from the doze mode 159 to the sleep state 153 or the soft-off state 155 in the power idle state will be described below with reference to the flowchart of FIG. 9. In block 301, the system 10 operates in the normal mode 157. In block 303, when a user closes the LCD casing, the lid sensor 83 is activated and the chip set 19 interrupts the CPU 11. A changeover event is transmitted to the PM program 105 via the OS 107. The PM program 105 receiving the changeover event calls out an API function and acquires information on names and process IDs of all the currently-generated processes and privileged modes thereof from the process list 115 of the process managing unit 113.

The currently-generated processes are managed in any state of a running state, an executable state, an execution waiting state, and a forcibly-suspended state by the process managing unit 113. The PM program 105 extracts processes to be forcibly suspended from all the processes, calls out the API functions of the extracted processes, and changes over the processes to the forcibly-suspended state. The processes changed over to the forcibly-suspended state stop their running and thus the utilization rate of the CPU 11 is lowered.

The OS 107 lowers a set of operating frequency and operating voltage of the CPU 11 depending on the utilization rate of the CPU 11 detected by the power source managing unit 112. When it is determined that the CPU 11 is in the idle state or the utilization rate is equal to or less than a predetermined value, the power source managing unit 112 changes over the CPU 11 to the sleep state or a Cn state in which the lower the processing rate is, the lower the power consumption is and reduces the power consumption. The PM program 105 operates the switch group 80 through the use of the chip set 19 so as to operate only the minimum devices necessary for realizing the specific function and the basic function in the doze mode 159. In block 305, the system 10 changes over to the doze mode 159.

Even after the changeover to the doze mode 159, the EC 33 periodically monitors the power consumption P of the system 10. In block 307, the EC 33 starts monitoring the power idle state, which is described with reference to FIGS. 6 to 8, in block 309 when the power consumption P of the system 10 is lowered to the start power Pst at time t0. The process flow goes to block 319 when the changeover condition to the suspended state 161 is established, and the process flow goes to block 313 when the changeover condition is not established. The case where the changeover condition is not established is any one of a case where the average power consumption value Pav is larger than the upper limit value Pih, a case where the average power consumption value Pav is smaller than the lower limit value Pil, and a case where the reference value of the line 183 is not satisfied.

In block 313, the EC 33 compares the average power consumption value Pav with the lower limit value Pil. The process flow goes to block 315 when the average power consumption value Pav is smaller than the lower limit value Pil and the process flow goes to block 316 when the average power consumption value is larger than the lower limit value. In block 316, the EC 33 compares the average power consumption value Pav with the upper limit value Pih. The process flow returns to block 309 when the average power consumption value Pav is smaller than the upper limit value Pih, and the process flow goes to block 317 when the average power consumption value Pav is larger than the upper limit value. The case where the process flow returns to block 309 is a case where the average power consumption value Pav does not satisfy the reference value of the line 183. In block 317, the EC 33 resets the timer 59, stops monitoring the power idle state, and performs block 307 again.

In block 315, the EC 33 determines whether the elapsed time t from time t0 reaches a predetermined time tout. The predetermined time is set to a time longer enough than the maximum observation time sx of FIG. 7. When the average power consumption value Pav is smaller than the lower limit value Pil, the doze mode 159 may be maintained. When the elapsed time reaches the predetermined time tout, the process flow goes to block 319 so as to change over to the suspended state 161. In accordance with the procedure of block 315, it is possible to prevent consumption of the battery by maintaining the power-on state 151 for a predetermined time tout or more when the laptop PC is uncontrolled. When the elapsed time t does not reach the predetermined time tout, the process flow returns to block 316.

In block 319, the EC 33 sets a changeover event for changing over to the suspended state 161 by the use of the chip set 19. By causing the chip set 19 to interrupt the CPU 11, the changeover event is notified to the PM program 105 via the OS 107. The PM program 105 determines whether the currently-executed processes acquired from the process list 115 include processes of an important program registered in the black list. When the important processes are being executed, the changeover to the suspended state 161 is held off.

When the important processes are not being executed, the process flow goes to block 321. The PM program 105 resumes the forcibly-suspended processes during the doze mode 159 and changes over the processes to an executable state. The power of the stopped devices is restored to change over the system 10 to the normal mode 157. Subsequently, when the PM program 105 requests the OS 107 to change over to the suspended state 161, the OS 107 requests the devices in operation or the program in execution to store contexts in the system memory 13.

When preparation for the changeover to the suspended state 161 is complete, the OS sets the register of the chip set 19 so as to change over to the suspended state 161. When the changeover event is set in the register of the chip set 19, the EC 33 controls the DC/DC converter 79 via the power controller 81. As a result, the system 10 changes over from the doze mode 159 to the suspended state 161 via the normal mode 157.

When the system operates in the normal mode 157 and the load of the laptop PC is reduced, the power consumption P of the system 10 is lowered. Particularly, in the method of changing over the CPU 11 in the power-on state to a deeper sleep state, and dynamically stopping the supply of power to many devices, and recognizing the utilization-rate idle state to change over to the power saving state by introducing the new power management technique, the opportunity of quick resuming is lost more than necessary. In one embodiment, by skipping the procedures of blocks 303 and 305 and directly changing over the system 10 from the normal mode 157 to the suspended state 161, it is possible to secure the opportunity of quick resuming.

While the changeover destination from the doze mode 159 or the normal mode 157 is described hitherto to be the suspended state 161, the changeover destination may be the hibernation state 163 or the soft-off state 155. A changeover trigger to the doze mode may be the operation of a GUI, the pressing of an Fn key of the keyboard, the pressing of the power button 85, or the turning-off of the screen instead of the lid sensor 83. After changing over to the suspended state 161, the power state can be changed over to the hibernation state 163 or the soft-off state 155 by the reduction of remaining capacity of the battery set 73, the elapse of a predetermined time after changing over to the power idle state, or the like. While the EC 33 determines the changeover condition to the suspended state 161 in the above description, the changeover condition may be determined by the battery unit 37 or the PM program 105.

While the method of controlling the power state when the system 10 is supplied with power from the battery unit 37 has been described, the present techniques can be applied to a case where the laptop PC is supplied with power from an AC/DC adapter 77. In this case, when the power source for measuring the power consumption P of the system 10 is temporarily switched from the AC/DC adapter 77 to the battery unit 37, the power consumption P of the system 10 can be acquired from the discharging data of the battery unit 37. Alternatively, a power detection circuit made to send power information by the EC 33 may be formed of a sensing resistor for detecting power, which is connected between the AC/DC adapter 77 and the DC/DC converter 79.

While specific embodiments illustrated in the drawings of the present invention have been described, the present invention is not limited to the embodiments illustrated in the drawings, but any configuration known hitherto may be employed as long as it can derive the effects of the present invention.

DESCRIPTION OF SYMBOLS

10: SYSTEM OF LAPTOP PC
33: EMBEDDED CONTROLLER (EC)
37: BATTERY UNIT
50: POWER BLOCK OF LAPTOP PC

What is claimed is:

1. A method comprising:
    measuring an average power consumption of a computer for each of a plurality of observation times over a specified time period, wherein a timer for the specified time period is activated in response to a power consumption of the computer being less than a threshold power consumption;
    causing the computer to determine whether a changeover condition has occurred by comparing the average power consumption of the computer for each observation time with a first reference value and a second reference value, the second reference value being less than the first reference value;
    changing over to a power-saving state from a power-on state when the changeover condition is determined to have occurred in response to the average power consumption of the computer for an observation time being less than the first reference value and larger than the second reference value; and
    changing over to a power consumption state that allows the computer to resume within a period of time in response to the average power consumption of the computer for an observation time being less than the second reference value.

2. The method of claim 1, wherein the second reference value is equal to or less than five times the power consumption of the system in the power-saving state.

3. The method of claim 1, wherein causing the computer to determine whether a changeover condition has occurred is conducted in a first amount of time when the average power consumption value is greater than a predetermined amount and in a second amount of time when the average power consumption value is below the predetermined amount, the first amount of time being less than the second amount of time.

4. The method of claim 1, further comprising responsive to changing over to the power saving state forcibly suspending a process generated by a predetermined program in a power-on state and stopping a supply of power to a device associated with performance of the forcibly-suspended process.

5. The method of claim 1, further comprising:
    setting a power idle state for a predetermined range of power consumption of a computer operating in a power-on state;
    causing the computer to recognize that the system changes over to the power idle state; and
    and wherein the changeover condition is determined to have occurred when it is determined that the system stays in the power idle state.

6. The method of claim 5, further comprising:
    estimating a depth of the power idle state on the basis of the magnitude of the power consumption; and
    setting a time for changing over to the power-saving state to be longer as the depth becomes deeper.

7. The method of claim 5, wherein the power-on state is a state in which the system operates in a doze mode in which a predetermined process is forcibly suspended when an event for stopping use of a portable computer is received.

8. The method of claim 5, further comprising stopping a supply of power to a device other than a processor in the power-on state.

9. The method of claim 1 further comprising:
    setting a power idle state for a predetermined range of power consumption of a computer operating in a power-on state; and
    providing a reference value of a characteristic, in which a changeover condition to a power-saving state is established with a longer staying time as the power consumption of the system in the power idle state becomes smaller, to the computer.

10. An apparatus comprising:
    a computer having a processor;
    a plurality of devices connected with the computer;
    a calculation unit that acquires an average power consumption value of the computer in a power-on state for each of a plurality of observation times over a specified time period, wherein a timer for the specified time period is activated in response to a power consumption of the computer being less than a threshold power consumption;
    a determination unit that determines a changeover condition by comparing the average power consumption value for each observation time with a first reference value and a second reference value, the second reference value being less than the first reference value; and
    a control unit that changes over the computer from the power-on state to a power-saving state when the changeover condition is established in response to the average power consumption of the computer for an observation time being less than the first reference value and larger than the second reference value, and that changes over the computer to a power consumption state that allows the computer to resume within a period of time in response to the average power consumption of the computer for an observation time being less than the second reference value.

11. The computer of claim 10, wherein the changeover condition is established when the power consumption value is smaller than the first reference value continuously over a predetermined time.

12. The computer of claim 10, wherein the first reference value has a characteristic in which the changeover condition is established in a longer elapsed time after the power consumption value becomes smaller than the first reference value as the power consumption value becomes smaller.

13. The computer of claim 10, wherein the computer is a portable computer having a battery unit mounted thereon and the calculation unit acquires the power consumption of the computer from discharging data of the battery unit.

14. The computer of claim 13, wherein a predetermined process is forcibly changed over to a suspended state in response to operation of a lid sensor in the power-on state.

15. A program product comprising a non-transitory computer readable storage medium that stores code executable by a processor, the executable code comprising code to perform:
   setting a power idle state for a predetermined range of power consumption of a system;
   measuring an average power consumption of the system for each of a plurality of observation times over a specified time period, wherein a timer for the specified time period is activated in response to a power consumption of the system being less than a threshold power consumption;
   determining whether the system changes over to the power idle state by comparing the average power consumption of the system for each observation time with a first reference value and a second reference value, the second reference value being less than the first reference value;
   changing over to the power-saving state from a power-on state when it is determined that the system stays in the power idle state in response to the average power consumption of the system for an observation time being less than the first reference value and larger than the second reference value; and
   changing over to a power consumption state that allows the system to resume within a period of time in response to the average power consumption of the system for an observation time being less than the second reference value.

16. The program product of claim 15, further comprising code to perform:
   counting a staying time in which the system stays in the power idle state; and
   changing over to the power-saving state when the staying time reaches a predetermined value so as to balance ability to quickly resume and reduction of power consumption in a computer operating in a power-on state.

* * * * *